United States Patent Office 3,418,308
Patented Dec. 24, 1968

3,418,308
WATER-SOLUBLE PYRIMIDINE DYES
Hans Ischer and Hans Siegrist, Basel, Switzerland, assignors to Sandoz Ltd. (also known as Sandoz AG), Basel, Switzerland
No Drawing. Continuation-in-part of application Ser. No. 109,009, May 10, 1961. This application Nov. 13, 1963, Ser. No. 323,272
Claims priority, application Switzerland, Apr. 27, 1961, 4,989/61
17 Claims. (Cl. 260—154)

ABSTRACT OF THE DISCLOSURE

Water-soluble pyrimidine dyes of good fastness properties on animal fibers, synthetic polyamide fibers, cellulosic fibers, etc. correspond to the formula

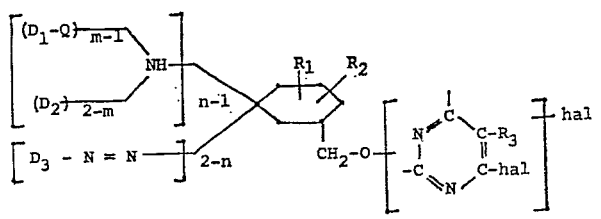

wherein the several variables have the meanings set forth in the disclosure proper. The characteristic and determining feature is the positioning of the —$CH_2O$— pyrimidine radical on the middle component.

The present application is a continuation-in-part of our application Ser. No. 109,009; filed on May 10, 1961 (now abandoned).

The invention relates to water-soluble pyrimidine dyes of the formula

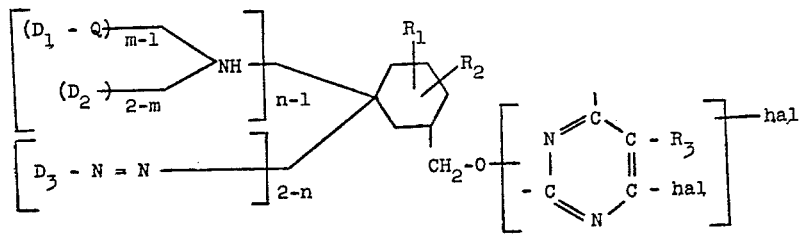

wherein $D_1$ is the radical of a monoazo dye bearing from 1 to 3 sulfonic acid groups, e.g. of the benzene-azo-naphthalene, naphthalene-azo-naphthalene or benzene-azo-5-pyrazolone series, of a 1-amino-4-arylamino-anthraquinone-2-sulfonic acid, -2,5-, -2,6-, -2,7- or -2,8-disulfonic acid dye or of a copper-phthalocyanine dye, bearing from 2 to 3 sulfonic acid groups or from 1 to 2 sulfonic acid groups and from 1 to 2 sulfonic acid amide groups, $D_2$ is a 1-amino-anthraquinone-2-sulfonic acid radical which is bound to —NH— in the position 4 and may bear an additional sulfonic acid group in one of the positions 5, 6, 7 and 8, $D_3$ is the radical of a coupling component bearing from 1 to 3 sulfonic acid groups of the hydroxy-naphthalene, aminonaphthalene, 1-phenyl-3-methyl-5-pyrazolone, 1-naphthyl-3-methyl-5-pyrazolone, acetoacetylaminobenzene, acetoacetylaminonaphthalene or phenylazo-amino-hydroxy-naphthalene series, phenylazo being in ortho-position to amino, Q represents —CO— or —$SO_2$— and is bound to a carbon atom of $D_1$, $R_1$ represents hydrogen, hydroxy, chlorine, bromine, cyano, methyl or lower alkoxy (e.g. methoxy, ethoxy), $R_2$ represents hydrogen, chlorine, bromine, methyl or lower alkoxy (e.g. methoxy, ethoxy), $R_3$ represents hydrogen, chlorine, bromine, methyl, carboxy or carboxymethyl, hal represents a halogen atom with an atomic number from 17 to 35, inclusive, i.e. chlorine or bromine, $n$ represents one of the integers 1 and 2, and $m$ represents one of the integers 1 and 2.

The process for the production of the new dyes comprises (a) reacting dyes of the formula

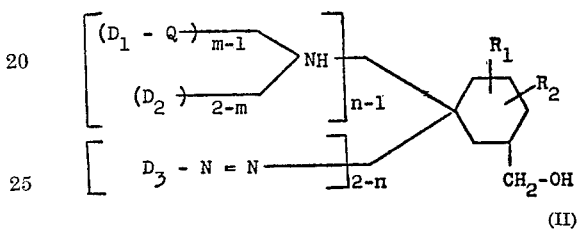

with a halopyrimidine of the formula

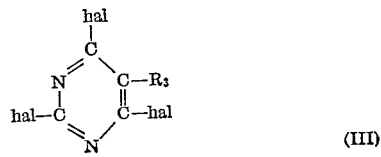

or (b) condensing a compound of the formula

$D_1$—Q———hal with an amine of the formula

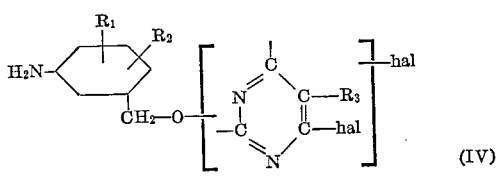

or (c) condensing an intermediate which is capable of dye formation and bears a —$SO_2$—hal or —CO—hal group with an amine of the formula

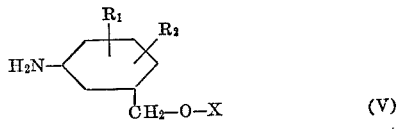

wherein X represents hydrogen or the radical of the formula

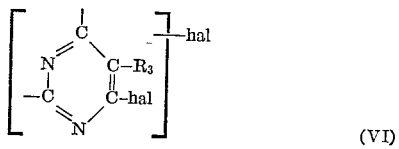

and, when X represents hydrogen, reacting with a halopyrimidine of the Formula III, and converting the obtained intermediates into water-soluble dyes by azo coupling or by condensation.

(d) coupling the diazo compound of an amine of the Formula IV with a coupling component bearing 1 to 3 sulfonic acid groups.

The process according to (a) is applicable in principle with all known classes of dyes, especially the series of anthraquinone, phthalocyanine and azo dyes, of which the monoazo and disazo dyes as a rule give particularly interesting results. The dyes, especially the phthalocyanine and azo dyes, may contain metal atoms bound by coordination links, for example chromium, cobalt, nickel or copper atoms, or metallizable groupings, the latter being converted into the corresponding metal complexes in substance or on the fiber by the known methods.

The second mode of operation (b) of the process consists in reacting amines of Formula IV with organic dyes contain at least one —CO-hal or —$SO_2$-hal group. Suitable dyes of this type are e.g. azo, anthraquinone and phthalocyanine dyes containing the aforecited groups.

For example, azo dyes may be used which contain at least two sulfonic acid chloride groups of which one is reacted with an amine of Formula IV while the other or others are saponified to sulfonic acid groups, care being taken that the reactive group is not damaged. Suitable anthraquinone dyes are e.g. 1-amino-2-sulfo-4-arylaminoanthraquinones which bear one or two sulfonic acid chloride groups in the arylamino nucleus. The phthalocyanine dyes contain preferably three or four sulfonic acid chloride groups e.g. copper phthalocyanine-tri- or -tetrasulfonic acid chloride.

In place of dyes containing at least one —CO-hal or —$SO_2$-hal group, organic compounds (procedure (c)) can be employed which contain at least one —CO-hal or —$SO_2$-hal group and in addition at least one substituent which permits dye formation. An example of such a substituent rendering the compound capable of dye formation is the amino group which can be formed by saponification of an acylamino group or by reduction of a nitro group and subsequent diazotization, upon which the resulting diazonium compound is coupled. Generally, the substituent can be one which is reacted by the standard methods of dye chemistry so that from the preliminary product a dye is formed. At least one of the components forming the dye must contain the number of water-solubilizing groups necessary to impart water-solubility on the dye, notable examples being carboxylic and sulfonic acid groups and sulfonic acid amide groups.

The condensation of the amines (IV) with the named dyes or with the compounds convertible into dyes is conducted preferably in aqueous medium. But is can also be carried out in organic solvents or in mixtures of organic solvents and water, these media being particularly advantageous in the case of poorly water-soluble or water-insoluble intermediate products. Suitable organic solvents are alcohols, acetone, benzene, toluene, chlorobenzene and tertiary organic bases such as pyridine.

The condensation temperature is adjusted to the reactivity of the individual starting products and varies within wide limits. The preferred temperature range is 0° to 10° C. but somewhat higher temperatures can also be employed.

According to the procedure (d) an amine of Formula IV is diazotized and coupled with a water-soluble coupling component; the known and commonly used methods are employed, the preferred coupling conditions being a temperature of 0–20° C., especially 0–10° C., and a weakly acid, neutral or weakly alkaline medium.

Examples of suitable coupling components are:

1-(2′-chloro-5′-sulfo)phenyl-3-methyl-5-pyrazolone,
1-(3′-sulfo)- or 1-(4′-sulfo)-phenyl-3-methyl-5-pyrazolone,
1-(2′.5′-disulfo)- or 1-(2′.4′-disulfo)-phenyl-3-methyl-5-pyrazolone,
1-(4″-acetylamino-2′.2″-disulfo-1′.1″-stilbenyl-4′)-3-methyl-5-pyrazolone,
1-(2′.5′-dichloro-4′-sulfo)-phenyl-3-methyl-5-pyrazolone,
1-[(5′.7′- or 4′.8′- or 6′.8′-disulfo)-naphthyl (2′)]-3-methyl-5-pyrazolone,
2-hydroxynaphthalene-4-, -6-, -7- or -8-sulfonic acid,
2-hydroxynaphthalene-3.6- or -6.8-disulfonic acid or -3.6.8-trisulfonic acid,
1-(2′-hydroxy)-ethoxy-8-hydroxynaphthalene-3.6-disulfonic acid,
1-hydroxynaphthalene-4- or -5-sulfonic acid,
1-hydroxynaphthalene-3.6- or -4.6-disulfonic acid or -3.6.8-trisulfonic acid,
6-chloro-2-hydroxynaphthalene-4-sulfonic acid,
1-(4′-chloro)-benzoylamino-8-hydroxynaphthalene-3.6-disulfonic acid,
1-(4′-methyl)-phenylsulfonylamino-8-hydroxynaphthalene-3.6-disulfonic acid,
1-acetylamino- or 1-propionylamino-8-hydroxynaphthalene-2.4-, -3.6- or -4.6-disulfonic acid,
1-benzoylamino-8-hydroxynaphthalene-2.4-, -3.6- or -4.6-disulfonic acid,
1-acetylamino- or 1-propionylamino-8-hydroxynaphthalene-4-sulfonic acid,
2- or 3-acetylamino-, -propionylamino- or -benzoylamino-5-hydroxynaphthalene-7-sulfonic acid,
2-acetylamino- or 2-benzoylamino-8-hydroxynaphthalene-3.6-disulfonic acid,
1-acetoacetylaminobenzene-3- or -4-sulfonic acid,
-2.4- or -2.5-disulfonic acid,
1-acetoacetylamino-2-methyl- or -2-methoxy- or -2-chloro-benzene-5-sulfonic acid,
1-acetoacetylamino-4-methyl- or -4-chlorobenzene-2-sulfonic acid,
1-acetoacetylamino-2.4-dimethylbenzene-6-sulfonic acid,
1-acetoacetylaminonaphthalene-4-, -5-, -6-, -7- or -8-sulfonic acid,
-3.6-, -3.8- or -4.8-disulfonic acid or -3.6.8-trisulfonic acid,
2-acetoacetylaminonaphthalene-5- or -6-sulfonic acid,
-3.6-, -4.8-, -5.7- or -6.8-disulfonic acid or -3.6.8- or -4.6.8-trisulfonic acid.

The amines of Formula IV are prepared by reacting halopyrimidines of Formula III with amines of the formula

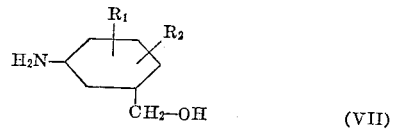

Suitable amines of this type are e.g. 3-amino-4- or -6-methoxy- or -ethoxybenzyl alcohol, 3-amino-2-, -4- or -6-methylbenzyl alcohol, 3-amino-4- or -6-hydroxy-benzyl alcohol, 3-amino-4- or -6-chloro- or -4-cyanobenzyl alcohol, 3-amino-4-butoxybenzyl alcohol, 3-amino-4.5-diethoxybenzyl alcohol, 3-amino-5-bromo-6-hydroxybenzyl alcohol, 3-amino-2-methyl-5-chlorobenzyl alcohol, 3-amino-4-methyl-5-chlorobenzyl alcohol and above all 3-aminobenzyl alcohol itself.

The reaction of the amines of Formula VII or of the intermediates or of the water-soluble dyes bearing a —$CH_2$—OH group with the halopyrimidines of the Formula III is carried out preferably in aqueous medium, but it can also be carried out in organic solvents or in mixtures of organic solvents and water, which can be of especial advantage for the reaction of poorly water-soluble or water-insoluble intermediate products. Suitable organic solvents are alcohols, acetone, benzene, toluene, chlorobenzene, and tertiary organic bases such as pyridine etc. The halopyrimidines can be used as such in concentrated form or in solution in an organic solvent. Acetone, benzene, chlorobenzene and toluene are specially suitable solvents for the halopyrimidines.

The reaction temperature is adjusted to the reactivity of the individual starting products. The prefered temperature range is 0 to 10° C., but higher temperatures up to about 30° C. can be used.

The reaction is carried out in an alkaline medium, preferably in a strongly alkaline medium. To neutralize the hydrogen halide formed, an acid-binding agent e.g. sodium or potassium carbonate, trisodium phosphate, sodium hydroxide, potassium hydroxide, calcium hydroxide or barium hydroxide is added to the reaction solution in solid, pulverized form or as an aqueous solution either at the start of or during the reaction. The addition of small amounts of a wetting or emulsifying agent to the reaction mixture can accelerate the rate of reaction.

The final pyrimidine dye is salted out of its solution or suspension (which if desired may be previously neutralized) with sodium or potassium chloride or precipitated with acid, and is then filtered with suction, washed, neutralized and dried. The amines of Formula IV and the intermediates which bear a group of the formula

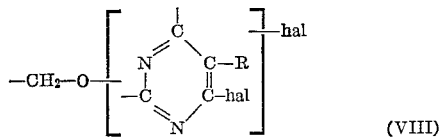

(VIII)

are in general poorly soluble in water and can be isolated by filtration, if necessary, after precipitation by means of salts, or they can be directly employed for the conversion into water-soluble dyes, e.g. by diazotizing the amines of Formula IV. If the reaction with the halopyrimidines of Formula III has been carried out in organic medium the reaction products are isolated by one of the fundamental operations such as direct filtration, evaporation of the solvent and filtration, precipitation by means of a suitable agent and filtration etc.

The new water-soluble pyrimidine dyes are suitable for dyeing leather, for dyeing, padding and printing fibers of vegetable and animal origin such as cotton, linen, hemp, ramie, jute, wool, silk, fibers of regenerated cellulose such as viscose staple fiber and filament yarn, casein fibers, animalized cellulosic fibers, synthetic polyamide fibers e.g. nylon, "Perlon," "Rilsan" (registered trademarks) and mixtures of the aforenamed fibers. The dyes with 1 or 2 sulfonic acid groups are rather suitable for the acid dyeing of wool, silk and synthetic polyamide fibers and for the dyeing of cellulosic fibers by the exhaustion process, whereas the better soluble dyes with 2 or more sulfonic acid groups can be used for the printing and the pad-dyeing of cellulosic fibers. The new dyes are applicable by semi- and full-continuous dyeing techniques such as the pad-jig "Pad-Roll" (registered trademark), pad-steam, pad-batch and thermal fixation process. They are also suitable for dyeing viscose (cellulose xanthate) in the spinning solution, the spun-dyed shades thus obtained have very good light and wet fastness.

The optimum trial conditions for the application of the dyes vary very considerably according to the nature of the fiber. For the dyeing, padding or printing of animal fibers and synthetic polyamide fibers it is preferable to use an acid, neutral or weakly alkaline medium for the application or fixation of the dyes, containing, for example, acetic acid, formic acid, sulfuric acid, ammonium sulfate, lactic acid, oxalic acid, sodium acetate, sodium bicarbonate, sodium or potassium carbonate, sodium metaphosphate, trimethylamine, pyridine, quinoline etc. The dyes can also be applied from acetic acid to neutral medium in presence of levelling agents, e.g. polyoxethylated fatty amines or mixtures of these and alkylpolyglycol ethers, and the bath adjusted to a neutral or weakly alkaline reaction at the end of dyeing by the addition of small amounts of an agent of alkaline reaction, e.g. ammonia, sodium bicarbonate or carbonate etc. or compounds which react alkaline on heating, e.g. hexamethylene tetramine, urea. Following this, the goods are thoroughly rinsed and if necessary acidified with a little acetic acid.

The dyeings and prints on animal fibers and synthetic polyamide fibers possess good fastness to light, washing, milling, perspiration, water, rubbing and dry cleaning. Owing to the formation of a chemical linkage between the dye molecule and the fiber molecule the fixed dyeings and prints also can withstand a treatment with boiling 1:1 pyridine-water mixture.

The dyeing, padding and printing of cellulosic fibers is carried out in alkaline medium, e.g. in presence of sodium bicarbonate, sodium or potassium carbonate, sodium or potassium hydroxide solution, calcium hydroxide, sodium metasilicate, sodium borate, water glass, trisodium phosphate, ammonia, etc. To prevent reduction reactions during dyeing, padding or printing the addition of a mild oxidizing agent, e.g. sodium 1-nitrobenzene-3-sulfonate, is often of advantage. The fixation of the dyes in dyeing, padding and printing can be carried out simultaneously with or subsequent to application, in the same bath or in a fresh bath, if necessary after intermediate drying. If a fresh bath is used it is advisable to carry out fixation in presence of water-soluble salts, e.g. sodium chloride or sulfate, in order to avoid a partial redissolving of the dye in the bath. The fixation of the dye radical on the fiber can be carried out by heating e.g. by steaming at 100–104° C., by dry heating at temperatures from 120 to 200° C., by conditioning at 80–100° C. and at constant humidity, by treating at 80–100° C. in an alkaline solution containing per liter 200–300 grams of sodium chloride or sodium sulfate. However, by using sufficiently strong alkalis such as sodium or potassium hydroxide, triosodium phosphate, sodium metasilicate, and in some cases even sodium carbonate, it is also possible to fix the dyes at temperatures of about 20°–40° C. and preferably at room temperature (about 25° C.). The addition of certain quaternizable amines such as trimethylamine or triethylene diamine, or of the asymmetrical dimethylhydrazine, preferably in stoichiometric amounts, accelerates the fixation of the dye on the fiber so that the fixation temperature can be lowered and/or the fixation time shortened and/or the alkalinity or the amount of alkali reduced. The fixation results in the formation of a stable chemical linkage between the dye molecule and the fiber molecule to which are due the outstanding wet fastness properties of the dyeings and prints. The fixation yield is in most cases excellent, but a small amount of the dye applied generally does not take part in the reaction with the fiber and this unreacted portion is removed by suitable treatments such as washing and/or soaping, if necessary at higher temperatures. For this purpose synthetic detergents can be employed, e.g. alkylarylsulfonates, such as sodium dodecylbenzenesulfonate, alkyl sulfates such as sodium lauryl, cetyl or oleyl sulfate, optionally sulfated or carboxymethylated alkylpolyglycol ethers or optionally sulfated or carboxymethylated mono- and dialkylphenylpolyglycol ethers.

The dyeings on cellulosic fibers possess good fastness to light, washing, milling, water, perspiration, alkali, rubbing and dry cleaning.

In comparison with the known dyes which bear a halopyrimidylamino group of the formula

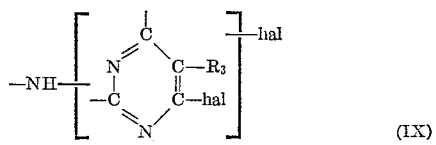

(IX)

the new dyes of the Formula I possess a considerably higher fixation rate on cellulosic fibers, so that their fixation is completed in a small fraction of the time required for the fixation of the dyes bearing a halopyrimidyl-amino group of the Formula IX.

In contrast to the dyes of the formula

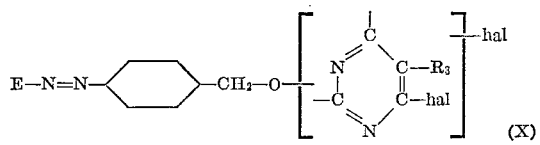

(X)

wherein E is the radical of a water-soluble coupling component, e.g. a hydroxynaphthalene-disulfonic acid, which react slowly with cellulosic fibers, the next comparable dyes of the formula

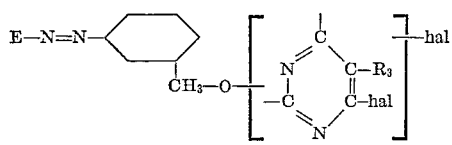

(XI)

react quickly with cellulosic fibers and give high fixation yields in a considerably shorter time than the dyes of the formula X.

This great difference in the dyeing properties is very surprising in view of the small difference in the structural formulae and could not be expected.

In the following examples the parts and percentages are by weight and the temperatures in degrees centigrade.

Example 1

47.9 parts of the dye (as sodium salt) produced by coupling diazotized 3-aminobenzyl alcohol with 1-(2'.5'-dichloro) - phenyl - 3 - methyl - 5 - pyrazolone - 4' - sulfonic acid are dissolved in 670 parts of water. The solution is cooled to 8–10° and brought to a pH value of 11–12 by adding a sodium hydroxide solution. In the course of 2 hours 20 parts of 2.4.6-trichloropyrimidine are added in small portions with vigorous stirring, and stirring continued at 8–10° for 10–20 hours until condensation is completed. During this time the pH value is maintained at 11–12 by dropping in a sodium hydroxide solution. The dye formed is filtered off, washed with a solution of common salt and dried. It is a water-soluble yellow powder which dyes wool, silk and cellulosic fibers in brilliant, greenish-yellow shades with very good fastness to light and wet treatments.

By replacing the 20 parts of 2.4.6-trichloropyrimidine by the equivalent amount of 2.4.6-tribromo- or 2.4.5.6-tetrachloro- or 2.4.5.6-tetrabromopyrimidine, similar dyes are obtained.

A solution of 0.2 part of the above-described dye in 25 parts of water is stirred into 235 parts of a viscose solution of 8.5% α-cellulose content. After stirring for 30 minutes at 20–25° and about 150 r.p.m. the colored spinning solution is placed in an refrigerator and left for about 10 hours to allow the entrapped air bubbles to escape. The de-aerated viscose solution is then spun in the normal manner. The filaments are washed in a solution of an anionic detergent at 50° and then in several fresh baths of water at 50°. They are then treated in a deacidifying bath, e.g. a solution of 0.3% sodium carbonate and 0.2% sodium bicarbonate, for 1 hour at 80–85°, then in a solution of an anionic detergent at 50° and once again in several baths of water at 50°. The filaments are then dried. They are dyed to a greenish yellow shade of very good fastness to light, washing, water, perspiration, rubbing and dry cleaning.

Example 2

12.3 parts of 3-aminobenzyl alcohol are dissolved in 150 parts of water and then 42 parts of 30% sodium hydroxide solution are added. The solution is cooled to 2° with ice, and during 3 hours a solution of 18.3 parts of 2.4.6-trichloropyrimidine in 22 parts of toluene is added dropwise with stirring, the temperature being maintained at 0–3°. Subsequently, stirring is continued for 10–15 hours at 0–3° and then 35.5 parts of 30% hydrochloric acid are added. After another hour the solution is filtered off, the residue washed with a common salt solution dried at 35–40° with vacuum.

13.5 parts of the 3-amino-1-(dichloropyrimidyloxymethyl)-benzene thus obtained are added to 170 parts of water, 14.7 parts of 30% hydrochloric acid and a small amount of an emulsifying agent. Diazotization is carried out at 15–20° by the addition of a solution of 3.5 parts of sodium nitrite in 10 parts of water, with vigorous stirring. Stirring is continued for a further 60 minutes at this temperature and then insoluble impurities are filtered off. The clear diazo solution is slowly added to a solution, cooled to 5°, or 17.3 parts of sodium 1-(2'.5'-dichloro)-phenyl-3-methyl-5-pyrazolone-4'-sulfonate and 10 parts of sodium bicarbonate in 300 parts of water. To complete coupling stirring is continued for a further 10 hours at this temperature and the pH value subsequently brought to 2–3 by the addition of hydrochloric acid. The dye formed is filtered off and dried at about 70° with vacuum. It is a yellow, water-soluble powder and identical with the dye of Example 1. 2 parts of the dried dye are dissolved in 4000 parts of water and the solution heated to 40°. 2 parts of acetic acid are added and 100 parts of a wool fabric are entered into this bath, which is brought to the boil within 15–20 minutes and maintained at the boil for 45–60 minutes. After cooling to 85–90°, 3 parts of 25% ammonia or 3 parts of hexamethylene tetramine are added and the bath maintained at 90° for 20 minutes. The fabric is rinsed thoroughly, acetic acid being added to one of the rinsings, and subsequently dried. A level, greenish yellow dyeing of good fastness to washing, perspiration, milling and light is obtained.

18.9 parts of sodium 1-phenyl-3-methyl-5-pyrazolone-2'.4'-disulfonate or 18.9 parts of sodium 1-phenyl-3-methyl-5-prazolone-2'.5'-disulfonate may be used as coupling component in place of 17.3 parts of sodium 1-(2'.5'-dichloro) - phenyl - 3 - methyl - 5 - pyrazolone - 4' - sulfonate to give yellow dyes which owing to their better solubility in water are also well suitable for the printing or the pad-dyeing of cellulosic fibers.

The 2.4.6-trichloropyrimidine used in the first paragraph of this example can be replaced by the equivalent amount of 5-bromo-2.4.6-trichloro- or 2.4.5.6-tetrachloropyrimidine. The final dyes obtained possess also excellent fastness to light and wet treatments.

Example 3

13.5 parts of 3-amino-1-(dichloropyrimidyloxymethyl)-benzene are diazotized according to the particulars of Example 2. The diazo solution is run with stirring into a solution, cooled to 2–4°, or 23.4 parts of sodium 1-benzoylamino - 8 - hydroxynaphthalene - 3.6 - disulfonate and 15 parts of sodium bicarbonate in 450 parts of water. Stirring is continued for a further 2 hours at 2–4°, the precipitated dye filtered off and washed with a common salt solution. After drying with vacuum, a red powder is obtained which dissolves in water with a red coloration.

Example 4

13.5 parts of 3-amino-1-(dichloropyrimidyloxymethyl)-benzene are diazotized according to the particulars of Example 2. The diazo solution is run into a neutral solution, cooled at 5°, of 17.4 parts of sodium 1-hydroxynaphthalene-3.6-disulfonate in 150 parts of water. During this time the temperature is maintained at 5° with ice. 10.5 parts of sodium bicarbonate are subsequently added and the resulting dye solution stirred overnight at 5–10°. The dye is then filtered off with suction and dried with vacuum. It is an orange-red powder which dissolves in water with a scarlet-red coloration. A fabric of viscose staple fiber is printed on a roller printing machine with a paste consisting of

| | Parts |
|---|---|
| Dye obtained as described above | 30 |
| Urea | 200 |
| Water | 305 |
| Sodium alginate thickening (4%) | 450 |
| Sodium carbonate | 15 |

The print is dried, steamed for 5–10 minutes at about 102°, rinsed thoroughly with cold water, soaped at the boil for 10 minutes, rinsed again with water and dried. A brilliant orange-red print is obtained which has very good wet and light fastness.

Example 5

13.5 parts of 3-amino-1-(dichloropyrimidyloxymethyl)-benzene are diazotized according to the particulars given in Example 2. The diazo solution is run into a solution, cooled to 0–2°, of 17.4 parts of sodium 1-hydroxynaphthalene-4.6-disulfonate and 10.5 parts of sodium bicarbonate in 200 parts of water. Ice is added at the same time to maintain the temperature constant at 0–2°, and the solution stirred overnight at this temperature. The precipitated dye is filtered off with suction, washed with 15% common salt solution and dried with vacuum. A red powder is obtained which dissolves in water with a scarlet coloration.

The same dye is also obtained by condensing 48.2 parts of the dye sodium 1-hydroxy-2-(3′-hydroxymethyl-phenylazo)-naphthalene-4.6-disulfonate with 18.5 parts of 2.4.6-trichloropyrimidine according to the details given in Example 1.

A mercerized cotton fabric is impregnated at room temperature with a freshly prepared padding solution containing 15 parts of the above dye, 150 parts of anhydrous sodium sulfate, 20 parts of sodium metasilicate and 13.5 parts of 30% sodium hydroxide solution in 1000 parts of water. The fabric is then squeezed to contain 80% of its weight of moisture and rolled up. The roll is wrapped in airtight material e.g. a sheet of polyethylene, and slowly rotated or stored for 4 hours at room temperature. It is then rinsed in cold and hot water, soaped at the boil for 15 minutes with a solution containing 0.5 g./l. of an anionic or a non-ionic detergent, e.g. an alkylpolyglycol or an alkylarylpolyglycol ether which may be sulfated or carboxymethylated and rinsed again. A brilliant scarlet dyeing, is obtained which is very fast to light and to wet treatments. The obtained dyeing is more than 3 times stronger than the corresponding dyeing produced with the condensation product of 2.4.6-trichloropyrimidine and sodium - 1 - hydroxy-2-(3′-aminophenylazo)-naphthalene-4.6-disulfonate.

A piece of mercerized cotton fabric is impregnated at room temperature on the pad with an aqueous solution containing 15 grams of the above dye per liter, squeezed so that the pick-up of liquor is about 70% and dried at room temperature and 65% relative humidity. The fixation is carried out for 60 minutes at 25° in a fixation bath containing 300 grams of anhydrous sodium sulfate and 5 grams of anhydrous sodium carbonate per liter. The fixed dyeing is rinsed with hot water and then with cold water, soaped for 15 minutes at the boil with a solution of 1 gram of soap per liter of distilled water, rinsed again and dried. The obtained scarlet dyeing is fast to light and to wet treatments and is about 3 times stronger than the corresponding dyeing produced with the condensation product of 2.4.6-trichloropyrimidine and sodium 1-hydroxy-2-(4′-hydroxymethyl-phenylazo) - naphthalene-4.6-disulfonate. By carrying out the fixation at 90° or by replacing the sodium carbonate by 2 ml. of 30% sodium hydroxide solution and working at 25° or at 90° the fixation rate is considerably increased but the ratio of the fixation yields remains about 3:1.

Example 6

49.6 parts of the dye (as the disodium salt) produced by coupling diazotized 3-amino-4-methyl-1-hydroxymethyl-benzene with 1-hydroxynaphthalene-4.6-disulfonic acid, are dissolved in 300 parts of water. 15 parts of 30% sodium hydroxide solution are added to this solution, which is cooled to 0–2°. In the course of 30 minutes it is run at this temperature into a vigorously stirred suspension containing 19 parts of 2.4.6-trichloropyrimidine and a small amount of an emulsifying agent in 100 parts of water at 0–2°.

On completion of condensation, the excess sodium hydroxide is neutralized with hydrochloric acid and the suspension diluted with 1000 parts of water and brought to a temperature of 50°. The dye is then precipitated with common salt, filtered off and dried. It is obtained a red powder which dissolves in water with a red coloration.

A cotton fabric is padded at room temperature with a padding liquor consisting of 30 parts of the above dye, 15 parts of calcined sodium carbonate and 150 parts of urea in 800 parts of water, using a pad with two or more bowls giving an expression (pick-up) of about 75%. It is then dried, preferably to a moisture content of about 10%. Condensation is carried out at 140–150° for 6 minutes, the fabric rinsed in cold and hot water, soaped at the boil and finally rinsed.

A red dyeing very fast to wet treatments and to light is obtained.

Example 7

A mixture consisting of 20 parts of 2.4.6-trichloropyrimidine and 100 parts of water is stirred vigorously at 0–2° with an emulsifier until an emulsion is formed. Then a solution of 8 parts of sodium hydroxide and 51.7 parts of the dye (as the disodium salt) produced by coupling diazotized 3 - amino - 4 - chloro - 1 - hydroxymethylbenzene with 1-hydroxynaphthalene-4.6-disulfonic acid in 320 parts of water is run in, the temperature being maintained at 0–2° by external cooling.

On completion of condensation the reaction mixture is neutralized with hydrochloric acid, diluted to 2 liters with water and heated to 60°. Water-insoluble byproducts are filtered off, and the dye formed precipitated with sodium chloride, filtered off and dried with reduced pressure at 50–60°.

The dye is obtained as a red powder which gives brilliant red shades of very good light and wet fastness when applied by the dyeing or printing processes described in Examples 2, 4 and 5.

The 3-amino-4-chloro-1-hydroxymethylbenzene used as diazo component can be produced from 2-chloro-1-nitrobenzene by reacting it with symmetrical dichlorodimethyl ether, subsequently hydrolysing the chloromethyl group and reducing the nitro group. A similar dye is produced if the 2.4.6-trichloropyrimidine is replaced by an equivalent amount of 2.4.6-tribromo-, 2,4,5,6-tetrachloro- or 2.4.5.6-tetrabromopyrimidine.

The following Table 1 contains further dyes of the formula

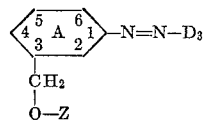

which are produced according to the details of Examples 1 to 7 and are characterized by the substituents of the nucleus A, the symbols $D_3$ and Z and the shade of the pad-dyeings on cotton or of the dyeings on wool.

TABLE 1

| No. of Example | Substituents of A Position (I) | Substituent (II) | Position (III) | Substituent (IV) | Z equals radical of— (V) | D₃ equals radical of— (VI) | Shade of the Pad-dyeings on Cotton or of the Dyeings on Wool (VII) |
|---|---|---|---|---|---|---|---|
| 8 | | | | | 2,4,5,6-tetrachloropyrimidine | 1-acetoacetylaminobenzene-2,4-disulfonic acid | Yellow. |
| 9 | | | | | do | 1-acetoacetylaminonaphthalene-3,6-disulfonic acid | Do. |
| 10 | | | | | 2,4,6-trichloro-5-methylpyrimidine | 1-acetoacetylaminonaphthalene-4-sulfonic acid | Do. |
| 11 | 6 | Chlorine | | | 2,4,6-trichloro-5-carboxymethylpyrimidine | 1-acetoacetylamino-2,5-dichlorobenzene-4-sulfonic acid | Do. |
| 12 | 6 | Cyano | | | 2,4,6-trichloropyrimidine | 1-(2'-naphthyl)-3-methyl-5-pyrazolone-5',7'-disulfonic acid | Do. |
| 13 | 6 | Methoxy | | | do | do | Do. |
| 14 | 6 | Ethoxy | | | do | 1-phenyl-3-methyl-5-pyrazolone-2',5'-disulfonic | Do. |
| 15 | 6 | Butoxy | | | do | 1-phenyl-3-methyl-5-pyrazolone-2',4'-disulfonic acid | Do. |
| 16 | 5 | Ethoxy | 6 | Ethoxy | do | do | Do. |
| 17 | 4 | Methyl | | | 2,4,6-trichloropyrimidine | 1-hydroxynaphthalene-4,6-disulfonic acid | Scarlet. |
| 18 | 6 | do | | | do | 2-hydroxynaphthalene-6,8-disulfonic acid | Orange. |
| 19 | | | | | do | do | Do. |
| 20 | 4 | Hydroxy | 5 | Bromine | do | 2-hydroxynaphthalene-3,6,8-trisulfonic acid | Red. |
| 21 | 2 | Methyl | 5 | Chlorine | do | do | Red. |
| 22 | 6 | Hydroxy | | | do | 2-hydroxynaphthalene-4-sulfonic acid | Orange. |
| 23 | 6 | do | | | 2,4,6-trichloro-5-carboxymethylpyrimidine | 2-hydroxynaphthalene-8-sulfonic acid | Do. |
| 24 | | | | | do | 2-hydroxynaphthalene-6-sulfonic acid | Do. |
| 25 | 2 | Methyl | 5 | Chlorine | 2,4,6-trichloropyrimidine | 1-acetylamino-8-hydroxynaphthalene-2,4-disulfonic acid | Bluish red. |
| 26 | 2 | do | 5 | do | 2,4,6-tribromopyrimidine | 2-acetoacetylaminonaphthalene-3,6,8-trisulfonic acid | Yellow. |
| 27 | 4 | Hydroxy | | | 2,4,6-trichloro-5-carboxypyrimidine | 1-propionylamino-8-hydroxynaphthalene-3,6-disulfonic acid | Bluish red. |
| 28 | 2 | Methyl | | | 2,4,6-trichloro-5-methylpyrimidine | 2-hydroxynaphthalene-6,8-disulfonic acid | Orange. |
| 29 | 4 | do | | | do | 1-naphthyl-(2')-3-methyl-5-pyrazolone-4',8'-disulfonic acid | Yellow. |
| 30 | 6 | do | | | do | do | Do. |
| 31 | 6 | do | | | 2,4,6-trichloropyrimidine | 1-hydroxynaphthalene-3,6-disulfonic acid | Orange-red. |
| 32 | 6 | do | | | do | 1-hydroxynaphthalene-4,8-disulfonic acid | Scarlet. |
| 33 | | | | | 2,4,5,6-tetrachloropyrimidine | 1-acetylamino-8-hydroxynaphthalene-3,6-disulfonic acid | Bluish red. |
| 34 | | | | | do | 1-phenyl-3-methyl-5-pyrazolone-2',4'-disulfonic acid | Greenish yellow. |
| 35 | 4 | Methoxy | | | 2,4,6-trichloropyrimidine | 1-phenyl-3-methyl-5-pyrazolone-3'-sulfonic acid | Yellow. |
| 36 | 4 | Ethoxy | | | do | 1-(4''-acetylamino-1'',1''-stilbenyl-4'-)-3-methyl-5-pyrazolone-2',2''-disulfonic acid | Do. |
| 37 | 4 | Chlorine | | | do | 1-(2'-hydroxy)-ethoxy-8-hydroxynaphthalene-3,6-disulfonic acid | Scarlet red. |
| 38 | 5 | do | 6 | Methyl | do | 1-acetylamino-8-hydroxynaphthalene-4,6-disulfonic acid | Bluish red. |
| 39 | | | | | | 1-acetylamino-8-hydroxynaphthalene-4-sulfonic acid | Do. |
| 40 | | | | | | 1-propionylamino-8-hydroxynaphthalene-4-sulfonic acid | Do. |
| 41 | | | | | | 1-benzoylamino-8-hydroxynaphthalene-4,6-disulfonic acid | Do. |
| 42 | 6 | Methyl | | | | 1-hydroxynaphthalene-3,6,8-trisulfonic acid | Red. |
| 43 | 6 | do | | | | 2-hydroxynaphthalene-3,6-disulfonic acid | Red. |
| 44 | | | | | | 1-benzoylamino-8-hydroxynaphthalene-2,4-disulfonic acid | Bluish red. |
| 45 | | | | | | 1-propionylamino-8-hydroxynaphthalene-4,6-disulfonic acid | Do. |
| 46 | | | | | 2,4,6-trichloropyrimidine | 1-hydroxynaphthalene-3-sulfonic acid | Scarlet. |
| 47 | | | | | do | 1-hydroxynaphthalene-4-sulfonic acid | Do. |
| 48 | | | | | do | 1-hydroxynaphthalene-5-sulfonic acid | Do. |
| 49 | | | | | do | 2-hydroxynaphthalene-7-sulfonic acid | Orange. |
| 50 | | | | | do | 1-(4'-chloro)-benzoylaminl-8-hydroxynaphthylene-3,6-disulfonic acid | Bluish red. |
| 51 | | | | | do | 1-hydroxy-8-chloronaphthalene-3,6-disulfonic acid | Scarlet. |
| 52 | 6 | Methyl | | | 2,4,6-trichloro-5-carboxypyrimidine | 2-hydroxy-6-chloronaphthalene-4-sulfonic acid | Orange. |
| 53 | 6 | Chlorine | | | do | 1-hydroxynaphthalene-3,8-disulfonic acid | Scarlet. |
| 54 | | | | | 2,4,6-trichloro-5-carboxymethylpyrimidine | 1-hydroxynaphthalene-5,7-disulfonic acid | Do. |
| 55 | | | | | do | 1-(4'-methyl)-phenyslufonylamino-8-hydroxynaphthalene-3,6-disulfonic acid | Bluish red. |
| 56 | | | | | do | 2-benzoylamino-5-hydroxynaphthalene-7-sulfonic acid | Scarlet. |
| 57 | | | | | do | 2-propionylamino-8-hydroxynaphthalene-6-sulfonic acid | Red. |
| 58 | | | | | do | 2-benzoylamino-8-hydroxynaphthalene-6-sulfonic acid | Red. |
| 59 | | | | | 2,4,6-trichloropyrimidine | 1,8-dihydroxynaphthalene-3,6-disulfonic acid | Red. |
| 60 | | | | | do | 1-acetoacetylaminobenzene-3-sulfonic acid | Yellow. |
| 61 | | | | | do | 1-acetoacetylamino-2-methylbenzene-4-sulfonic acid | Do. |
| 62 | | | | | do | 1-acetoacetylaminonaphthalene-5-sulfonic acid | Do. |
| 63 | 6 | Bromine | | | do | 2-benzoylamino-8-hydroxynaphthalene-3,6-disulfonic acid | Red. |
| 64 | | | | | 2,4,5,6-tetrabromopyrimidine | 2-acetylamino-8-hydroxynaphthalene-3,6-disulfonic acid | Red. |
| 65 | | | | | 2,4,6-trichloro-5-bromopyrimidine | 2-acetoacetylaminonaphthalene-4,6,8-trisulfonic acid | Yellow. |
| 66 | | | | | 2,4,6-trichloropyrimidine | 1-acetoacetylamino-4-methylbenzene-2-sulfonic acid | Do. |
| 67 | | | | | do | 1-acetoacetylamino-4-chlorobenzene-2-sulfonic acid | Do. |
| 68 | | | | | 2,4,5,6-tetrachloropyrimidine | 1-acetoacetylaminobenzene-2,5-disulfonic acid | Do. |
| 69 | | | | | do | 1-acetoacetylaminonaphthalene-4,8-disulfonic acid | Do. |
| 70 | | | | | 2,4,5,6-tetrabromopyrimidine | 1-acetoacetylaminonaphthalene-3,6,8-trisulfonic acid | Do. |
| 17 | | | | | do | 2-hydroxynaphthalene-3,6,8-trisulfonic acid | Red. |

TABLE—Cont'd

| No. of Example | Substituents of A | | | | Z equals radical of— (V) | D₃ equals radical of— (VI) | Shade of the Pad-dyeings on Cotton or of the Dyeings on Wool (VII) |
|---|---|---|---|---|---|---|---|
| | Position (I) | Substituent (II) | Position (III) | Substituent (IV) | | | |
| 72 | | | | | 2.4.5.6.-tetrabromopyrimidine. | 1-naphthyl-(2')-3-methyl-5-pyrazolone-6'.8'-disulfonic acid. | Yellow. |
| 73 | 6 | Hydroxy | | | 2.4.6-trichloropyrimidine | 2-acetoacetylaminonaphthalene-5,7-disulfonic acid. | Do. |
| 74 | 6 | Chloro | | | 2.4.6-tribromopyrimidine | 2-acetoacetylaminonaphthalene-6.8-disulfonic acid. | Do. |
| 75 | | | | | do | 1-acetylamino-8-hydroxynaphthalene-3.6-disulfonic acid. | Bluish red. |
| 76 | | | | | 2.4.6-trichloropyrimidine | 2-propionylamino-5-hydroxynaphthalene-7-sulfonic acid. | Scarlet. |
| 77 | 6 | Methyl | | | do | 2-acetoacetylamino-8-hydroxynaphthalene-6-sulfonic acid. | Red. |
| 78 | | | | | do | 1-acetoacetylaminobenzene-3-sulfonic acid | Yellow. |
| 79 | | | | | do | 1-acetoacetylaminonaphthalene-6-sulfonic acid | Do. |
| 80 | | | | | 2.4.6-trichloro-5-methyl-pyrimidine. | 2-acetylamino-5-hydroxy-naphthalene-7-sulfonic acid. | Scarlet. |
| 81 | | | | | 2.4.6-trichloropyrimidine | 2-formylamino-5-hydroxynaphthalene-7-sulfonic acid. | Do. |
| 82 | | | | | do | 1-formylamino-8-hydroxynaphthalene-3.6-disulfonic acid. | Bluish red. |
| 83 | 6 | Hydroxy | | | do | 1-phenyl-3-methyl-5-pyrazolone-3'-sulfonic acid. | Yellow. |
| 84 | 6 | Methyl | | | do | 1-phenyl-3-methyl-5-pyrazolone-4'-sulfonic acid | Do. |
| 85 | | | | | do | 1-acetoacetylamino-2-methoxybenzene-5-sulfonic acid. | Do. |
| 86 | | | | | do | 1-acetoacetylaminonaphthalene-7-sulfonic acid | Do. |
| 87 | 6 | Bromine | | | do | 1-acetoacetylaminonaphthalene-3.6-disulfonic acid. | Do. |
| 88 | 4 | Methyl | | | do | 2-hydroxynaphthalene-6.8-disulfonic acid | Orange. |
| 89 | 4 | Chlorine | | | do | 2-acetoacetylaminonaphthalene-4.8-disulfonic acid. | Yellow. |
| 90 | 6 | Cyano | | | do | 1-(2'-chloro-)-phenyl-3-methyl-5-pyrazolone-5'-sulfonic acid. | Do. |
| 91 | 6 | do | | | do | 1-acetoacetylaminonaphthalene-3.8-disulfonic acid. | Do. |
| 92 | | | | | do | 1-acetoacetylaminonaphthalene-8-sulfonic acid | Do. |
| 93 | | | | | 2.4.6-trichloro-5-carboxymethylpyrimidine. | 2-acetoacetylaminonaphthalene-6-sulfonic acid | Do. |
| 94 | | | | | do | 1-acetoacetylamino-2.4-dimethylbenzene-6-sulfonic acid. | Do. |
| 95 | | | | | do | 1-acetoacetylamino-2-chlorobenzene-5-sulfonic acid. | Do. |
| 96 | | | | | 2.4.6-tribromo-5-carboxymethylpyrimidine. | 2-acetoacetylaminonaphthalene-6.8-disulfonic acid. | Do. |
| 97 | 6 | Hydroxy | | | 2.4.6-trichloropyrimidine | 1-hydroxynaphthalene-4.6-disulfonic acid | Scarlet. |
| 98 | 6 | do | | | do | 1-hydroxynaphthalene-3.6-disulfonic acid | Do. |
| 99 | | | | | do | 2-amino-8-hydroxynaphthalene-6-sulfonic acid (acid coupling). | Red. |
| 100 | | | | | do | 2-amino-8-hydroxynaphthalene-3.6-disulfonic acid (acid coupling). | Red. |
| 101 | | | | | 2.4.6-trichloropyrimidine | 1-hydroxy-7-(4'-nitrophenylazo)-8-aminonaphthalene-3.6.2'-trisulfonic acid. | Greenish black. |
| 102 | | | | | do | 2-amino-5-hydroxynaphthalene-7-sulfonic acid (acid coupling). | Red. |
| 103 | | | | | 2.4.5.6-tetrachloropyrimidine. | 1-amino-8-hydroxynaphthalene-3.6-disulfonic acid (acid coupling). | Bluish red. |
| 104 | | | | | do | 1-hydroxy-7-phenylazo-8-aminonaphthalene-3.5.4'-trisulfonic acid. | Dark green. |
| 105 | | | | | 2.4.6-trichloropyrimidine | do | Do. |
| 106 | | | | | do | 1-hydroxy-5-phenylazo-6-aminonaphthalene-3.4'-disulfonic acid. | Red-brown. |
| 107 | | | | | 2.4.6-trichloro-5-carboxymethylpyrimidine. | do | Do. |
| 108 | 6 | Methyl | | | do | 1-hydroxy-7-phenylazo-8-aminonaphthalene-3.6.3'-trisulfonic acid. | Dark green. |
| 109 | | | | | 2.4.5.6-tetrabromopyrimidine. | do | Do. |
| 110 | | | | | 2.4.6-tribromopyrimidine | 1-amino-8-hydroxynaphthalene-4.6-disulfonic acid (acid coupling). | Bluish red. |
| 111 | | | | | 2.4.6-trichloropyrimidine | 1-hydroxy-8-aminonaphthalene-5.7-disulfonic acid. | Bordeaux. |

The metallizable dyes of Examples 22, 23, 73, 83, 97 and 98 can be treated with metal-yielding agents. If their dyeings are fixed on the fiber, and then aftercoppered, they present the following shades

| Example No. | Shade of aftercoppered dyeing |
|---|---|
| 22 | brownish red. |
| 23 | do. |
| 73 | orange-yellow. |
| 83 | do. |
| 97 | brownish red. |
| 98 | do. |

Example 112

57.6 parts of copper phthalocyanine are entered in 270 parts of chlorosulfonic acid and the solution heated at 240–145° for 3 hours. On cooling to room temperature it is run into a mixture of ice and water, and the precipitate filtered off at 0° and washed with ice-cold dilute hydrochloric acid. The press cake is stirred into 300 parts of ice and 300 parts of water and the pH value adjusted to 5 with dilute sodium hydroxide solution. 30 parts of 3-amino-1-(dichloropyrimidyloxymethyl)-benzene, obtainable by the procedure described in the first paragraph of Example 2, are strewn in and the suspension stirred overnight at 20–25°, a constant pH value of 5.0–5.5 being maintained by the addition of dilute sodium hydroxide solution. The solution is then rendered weakly alkaline by the addition of sodium hydroxide solution and heated at 40–50° for several hours until the remaining sulfonic acid chloride groups are saponified to sulfonic acid groups. The dye is salted out, filtered with suction and dried at 50° with vacuum. A dark blue powder is obtained which gives turquoise colored solutions in water. Mercerized cotton sateen is printed with a paste of the following composition:

| | Parts |
|---|---|
| Dye obtained as described in this example | 20 |
| Urea | 100 |
| Water | 405 |
| Sodium alginate thickening (4%) | 450 |
| Sodium 1-nitrobenzene-3-sulfonate | 10 |
| Calcined sodium carbonate | 15 |
| | 1000 |

The printed fabric is dried, steamed for 10 minutes at 100–103°, rinsed in cold and then in warm water, soaped at the boil for 15 minutes and rinsed again in warm and cold water. A brilliant turquoise blue print with very good light and wet fastness is obtained.

By condensing copper-phthalocyanine-trisulfonic acid chloride—obtained by sulfochlorination of the metal phthalocyanine for 2–3 hours at 115–120°—with 3-amino-1-(dichloropyrimidyloxymethyl)- or -1-(trichloropyrimidyloxymethyl)-benzene (from 2.4.6-tri- or 2.4.5.6-tetra-chloropyrimidine), excellent wool dyes are obtained which can be dyed as described in Example 2. The dyeings possess excellent fastness to wet treatments.

Example 113

53.4 parts of the trisodium salt of copper-phthalocyanine-4,4′,4‴-trisulfonic acid-4‴-sulfonic acid-(3′-hydroxymethyl)-phenylamide (obtained from copper-phthalocyanine-4,4′,4″,4‴-tetrasulfonic acid chloride and 3-hydroxymethyl-1-aminobenzene) are dissolved in 700 parts of water at room temperature. After cooling to about 5° the pH value is adjusted to 12.5 with 30% sodium hydroxide solution and 10 parts of 2.4.6-trichloropyrimidine are added in about 1 hour at 5–10°. The mixture is stirred for several hours at 5–10°, the pH-value being maintained at 12–12.5 by means of 30% sodium hydroxide solution. When the condensation is completed the reaction mass is neutralized with hydrochloric acid and the dye is precipitated with sodium chloride, filtered off, washed with a sodium chloride solution, dried and ground. It is a blue powder which is soluble in water with a turquoise coloration and dyes cellulose fibers according to the dyeing or printing methods described in Examples 4, 5 and 6 in turquoise shades fast to light and to wet treatments.

Further copper-phthalocyanine dyes of the formula

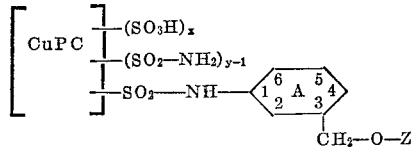

which are produced according to the particulars of Examples 112 and 113, are listed in the following Table 2. They are characterized in Columns (I) to (VIII) by the positions of the —$SO_3H$ and —$SO_2$— groups in the copper phthalocyanine molecule, by the values of $x$ and $y$, by the substituents of the nucleus A and their positions and by the halopyrimidine from which Z is derived. Since the shade of the dyeings on wool or cotton is in each instance turquoise blue, it has not been mentioned in a separate column of the table.

TABLE 2

| Example No. | Positions of —$SO_3H$ and —$SO_2$— (I) | $x$ (II) | $y$ (III) | Substituent (IV) | Position (V) | Substituent (VI) | Position (VII) | Z equals radical of— (VIII) |
|---|---|---|---|---|---|---|---|---|
| 114 | 3,3′,3″,3‴ | 1 | 3 | | | | | 2,4,6-trichloropyrimidine. |
| 115 | 3,3′,3″,3‴ | 1 | 3 | $CH_3$ | 6 | | | Do. |
| 116 | 3,3′,3″,3‴ | 3 | 1 | $CH_3$ | 6 | | | 2,4,6-trichloropyrimidine. |
| 117 | 3,3′,3″,3‴ | 3 | 1 | Cl | 6 | | | Do. |
| 118 | 3,3′,3″,3‴ | 3 | 1 | CN | 6 | | | Do. |
| 119 | 3,3′,3″,3‴ | 3 | 1 | $CH_3O$ | 6 | | | Do. |
| 120 | 4,4′,4″,4‴ | 3 | 1 | $C_2H_5O$ | 6 | | | 2,4,5,6-tetrachloropyrimidine. |
| 121 | 3,3′,3″,3‴ | 3 | 1 | $CH_3$ | 4 | | | Do. |
| 122 | 3,3′,3″,3‴ | 3 | 1 | $C_2H_5O$ | 5 | $C_2H_5O$ | 6 | 2,4,6-trichloropyrimidine. |
| 123 | 3,3′,3″,3‴ | 2 | 2 | $CH_3$ | 6 | | | Do. |
| 124 | 3,3′,3″,3‴ | 3 | 1 | $CH_3$ | 2 | Cl | 5 | Do. |
| 125 | 3,3′,3″,3‴ | 3 | 1 | $CH_3$ | 2 | | | Do. |
| 126 | 3,3′,3″,3‴ | 3 | 1 | Cl | 4 | | | Do. |
| 127 | 4,4′,4″ | 2 | 1 | | | | | Do. |
| 128 | 3,3′,3″ | 1 | 2 | | | | | 2,4,6-trichloro-5-carboxymethylpyrimidine. |
| 129 | 3,3′,3″,3‴ | 3 | 1 | OH | 4 | | | 2,4,6-trichloropyrimidine. |
| 130 | 3,3′,3″,3‴ | 3 | 1 | OH | 4 | Br | 5 | Do. |
| 131 | 3,3′,3″,3‴ | 3 | 1 | $C_4H_9O$ | 6 | | | Do. |
| 132 | 3,3′,3″,3‴ | 3 | 1 | $CH_3O$ | 4 | | | Do. |
| 133 | 3,3′,3″,3‴ | 3 | 1 | Cl | 5 | $CH_3$ | 6 | Do. |
| 134 | 3,3′,3″,3‴ | 3 | 1 | Br | 6 | | | Do. |
| 135 | 3,3′,3″,3‴ | 3 | 1 | | | | | 2,4,6-trichloro-5-bromopyrimidine. |
| 136 | 3,3′,3″,3‴ | 3 | 1 | | | | | 2,4,6-trichloro-5-methylpyrimidine. |
| 137 | 3,3′,3″,3‴ | 3 | 1 | | | | | 2,4,6-tribromopyrimidine. |
| 138 | 4,4′,4″,4‴ | 3 | 1 | | | | | 2,4,6-trichloro-5-carboxypyrimidine. |

Example 139

54.8 parts of sodium 1-amino-4-(3′-hydroxymethyl-phenylamino) - anthraquinone-2.7-disulfonate are dissolved in 350 parts of water in the presence of 17 parts of a 30% sodium hydroxide solution and 0.1 part of an anion active wetting agent. The solution is cooled to 0°–2° and under vigorous stirring a solution of 18.4 parts of 2,4,6-trichloropyrimidine in 20 parts of acetone are added dropwise in about 10 minutes. Stirring is continued for further 3 hours at 0–2° whereupon the reaction mass is diluted with 500 parts of ice-cold water. The pH-value is adjusted to 6.0–6.3 with acetic acid and the dye is precipitated by addition of sodium chloride, filtered off, redissolved in water and re-salted out. It is then filtered off, dried in vacuum at 40° and ground to a blue powder which dissolves in water with a blue coloration.

By replacing the 54.8 parts of sodium 1-amino-4-(3′-hydroxymethyl - phenylamino)-anthraquinone-2.7-disulfonate by 44.6 parts of sodium 1-amino-4-(3′-hydroxymethyl-phenylamino) - anthraquinone-2-sulfonate and carrying out the reaction in dilute aqueous solution (about 1600 parts of water) a less soluble dye is obtained which dyes wool or cotton in blue shades. Applied by a pad-dyeing technique and fixed at 25° in a salt solution containing sodium metasilicate and sodium hydroxide it shows a reactivity many times greater than that showed by the next comparable dye with a —NH— bridge instead of the —$CH_2$—O— bridge.

The following table contains further anthraquinone dyes which are produced according to the teaching of Example 139 and correspond to the formula

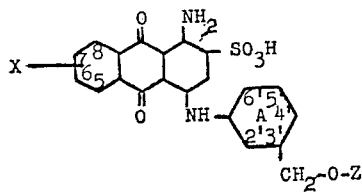

They are characterized by the substituent X and its position in the anthraquinone nucleus (Columns (I) and (II) ), by the substituents of the nucleus A and their position (Columns (III) to (VI) ) by the halopyrimidine from which Z is derived (Column (VII) ) and by the shade of the dyeings on wool or cotton (Column (VIII) ).

2',6'-dimethyl)-phenylamino - anthraquinone-2-sulfonic acid or when in place of 3-amino-1-(dichloropyrimidyl-oxymethyl)-benzene one of the following condensation products are employed:

(a) 3-aminobenzyl alcohol plus 2,4,5,6-tetrachloropyrimidine.
(b) 3-aminobenzyl alcohol plus 2,4,6-trichloro-5-bromopyrimidine.
(c) 3-aminobenzyl alcohol plus 2,4,6-tribromopyrimidine.
(d) 3-aminobenzyl alcohol plus 2,4,6-trichloro-5-carboxymethylpyrimidine.
(e) 3-amino-4-methyl-benzyl alcohol plus 2,4,6-trichloropyrimidine.
(f) 3-amino-4-chlorobenzyl alcohol plus 2,4,6-trichloropyrimidine.
(g) 3-amino-4-cyanobenzyl alcohol plus 2,4,6-trichloropyrimidine.
(h) 3-amino-4-methoxybenzyl alcohol plus 2,4,5,6-tetrachloropyrimidine.
(i) 3-amino-4,5-diethoxybenzyl alcohol plus 2,4,6-trichloropyrimidine.
(k) 3-amino-2-methyl-5-chlorobenzyl alcohol plus 2,4,6-trichloropyrimidine.
(l) 3-amino-2-methylbenzyl alcohol plus 2,4,6-trichloropyrimidine.
(m) 3-amino-6-methylbenzyl alcohol plus 2,4,6-trichloropyrimidine.
(n) 3-amino-6-ethoxybenzyl alcohol plus 2,4,6-trichloropyrimidine.
(o) 3-amino-6-chlorobenzyl alcohol plus 2,4,6-trichloropyrimidine.
(p) 3-amino-4-methyl-5-chlorobenzyl alcohol plus 2,4,6-trichloropyrimidine.
(q) 3-amino-4-bromobenzyl alcohol plus 2,4,6-trichloropyrimidine.
(r) 3-amino-benzyl alcohol plus 2,4,6-trichloro-5-methylpyrimidine.
(s) 3-amino-benzyl alcohol plus 2,4,6-trichloro-5-carboxypyrimidine.

TABLE 3

| Example No. | X | Position (II) | Substituents of A | | | | Z equals radial of— | Shade of Dyeing |
|---|---|---|---|---|---|---|---|---|
| | (I) | | Type (III) | Pos. (IV) | Type (V) | Pos. (VI) | (VII) | (VIII) |
| 140 | $SO_3H$ | 6 | | | | | 2,4,6-trichloropyrimidine | Blue. |
| 141 | $SO_3H$ | (1) | | | | | do | Do. |
| 142 | $SO_3H$ | 5 | $CH_3$ | 6' | | | do | Do. |
| 143 | $SO_3H$ | 7 | Cl | 6' | | | do | Do. |
| 144 | $SO_3H$ | 7 | $CH_3O$ | 6' | | | 2,4,5,6-tetrachloropyrimidine | Do. |
| 145 | $SO_3H$ | 8 | | | | | do | Do. |
| 146 | H | | | | | | 2,4,6-trichloro-5-carboxymethylpyrimidine | Do. |
| 147 | $SO_3H$ | 6 | $C_2H_5O$ | 5' | $C_2H_5O$ | 6' | 2,4,6-trichloropyrimidine | Do. |
| 148 | $SO_3H$ | 6 | $CH_3$ | 4' | | | do | Do. |
| 149 | $SO_3H$ | 7 | CN | 6' | | | do | Do. |
| 150 | $SO_3H$ | 7 | $CH_3$ | 2' | Cl | 5' | do | Do. |
| 151 | $SO_3H$ | 7 | $CH_3O$ | 4' | | | do | Do. |
| 152 | $SO_3H$ | 7 | | | | | 2,4,6-trichloro-5-methylpyrimidine | Do. |
| 153 | $SO_3H$ | 6 | Cl | 5' | $CH_3$ | 6' | 2,4,6-trichloropyrimidine | Do. |
| 154 | H | | | | | | 2,4,6-trichloro-5-carboxypyrimidine | Do. |
| 155 | $SO_3H$ | 6 | | | | | do | Do. |
| 156 | $SO_3H$ | 7 | | | | | 2,4,6-tribromopyrimidine | Do. |
| 157 | $SO_3H$ | 6 | | | | | 2,4,6-trichloro-5-bromopyrimidine | Do. |

1 5 or 8.

Example 158

43.6 parts of 100% 1-amino-4-(2',4',6'-trimethyl)-phenyl-amino-anthraquinone-2-sulfonic acid are entered in 270 parts of chlorosulfonic acid at 20–30°. When everything is dissolved, 80 parts of sulfuryl chloride are dropped in and the temperature increased to 50° in about 30 minutes. After being maintained for 16 hours at 50–55° the mixture is allowed to cool and then run into a mixture of 2000 parts of ice, 1000 parts of water and 200 parts of sodium chloride. The precipitate is filtered with suction, washed with 10% sodium chloride solution and suspended in 500 parts of water. The suspension is adjusted to pH 7 and 33 parts of finely pulverized 3-amino-1-(dichloropyrimidyl-oxymethyl)-benzene, obtained by the procedure given in the first paragraph of Example 2, are strewn in. Stirring is continued for a few hours at 20–30° with the addition of dilute sodium carbonate solution to maintain the pH value of the mixture at 7–7.5. When condensation is completed, the mixture is strongly acidified with hydrochloric acid, and the precipitated dye filtered with suction, washed with 1% hydrochloric acid to remove the small excess of 3-amino-1-(dichloropyrimidyloxymethyl)-benzene. The resulting dye paste is carefully neutralized with sodium carbonate and dried at 50° with vacuum. The ground dye is a dark blue powder which dissolves in water with a blue coloration and dyes wool by the dyeing method of Example 2 in brilliant blue shades of very good fastness to light, washing, milling, water, perspiration, rubbing and dry cleaning. The pad-dyeings and prints on cotton and viscose filament or staple fiber materials also possess very good light and wet fastness properties.

Similarly good dyes are obtained when the starting dye is replaced by 1-amino-4-phenylamino, -4-(2'-,3'- or 4'-methyl, -ethyl or -chloro)-phenylamino-, 4-(2'- or 4'-methoxy or -ethoxy)-phenylamino-, 4-(2',4'-, 2',5'- or Example 159

123 parts of 3-aminobenzyl alcohol are added to a solution of 54 parts of anhydrous sodium carbonate in 500 parts of water and in the course of 1 hour 240 parts of 4-acetylamino-benzenesulfonic acid chloride are added to the solution. The temperature is maintained at 35–40° until condensation is completed, and the resulting 3-(4'-acetylaminophenylsulfonylamino)-benzyl alcohol is isolated in the normal manner.

160 parts of dried 3-(4'-acetylaminophenylsufonylamino)-benzyl alcohol are suspended in 300 parts of water and 50 parts of 36% hydrochloric acid. The suspension is brought to the boil, held at the boil for 30–60 minutes and neutralized to precipitate the amine formed, which is then salted out, filtered with suction and dried.

27.8 parts of 3-(4'-aminophenylsulfonylamino)-benzyl alcohol are mixed with 350 parts of water, 30 parts of 30% hydrochloric acid and small amounts of an emulsifying agent. The mixture is cooled to 10°, diazotized at 10–15° by adding a solution of 7 parts of sodium nitrite in 20 parts of water with vigorous stirring, and stirred at 10–15° for about 1 hour longer to complete diazotization. The insoluble impurities are filtered off and the clear filtrate run slowly into a solution, cooled to 0°, of 45 parts of sodium 1-hydroxy-naphthalene-3,6,8-trisulfonate and 25 parts of sodium carbonate in 450 parts of water. The mixture is stirred for a few hours at 5–10° to complete the coupling reaction.

It is then diluted to 1500 parts and the pH value adjusted to 12 with 30% sodium hydroxyde solution. 20 parts of 2.4.6-trichloropyrimidine are added in small portions over 2 hours at 8–10°. The mixture is stirred at 8–10° with the pH value maintained at 11–12 until after 10–20 hours the condensation is completed. After neutralization the dye formed is salted out, filtered off, washed with a sodium chloride solution and dried with vacuum. It is a red powder and dyes wool, silk, synthetic polyamide fibers and cellulosic fibers in red shades with very good light and wet fastness properties.

When the diazo component 3-(4'-aminophenylsulfonylamino)-benzyl alcohol is replaced by the equivalent amount of 3-(3'-aminophenylsufonylamino)-benzyl-alcohol or 3-(4'- or 3'-aminobenzoylamino)-benzyl alcohol, dyestuffs with equally good properties are obtained.

The 3-(4'- or 3'-aminobenzoylamino)-benzyl alcohol can be prepared, for example, as follows: A solution of 123 parts of 3-aminobenzyl alcohol in 2000 parts of water is mixed with a solution of 300 parts of crystallized sodium acetate in 1000 parts of water. The mixture is held at 20–25° and 200 parts of 3- or 4-nitrobenzoyl chloride are slowly added. It is stirred at about 25–35° until no further amino group is indicated, upon which the precipitated condensation product is filtered with suction and the nitro group reduced to the amino group in aqueous or aqueous-organic suspension or in aqueous-organic or organic solution with iron filings and acid by the Béchamp method or by catalysis with hydrogen.

In place of 2.4.6-trichloropyrimidine, 2.4.6-trichloro-5-methyl-, -5-bromo-, -5-carboxy- or -5-carboxymethyl- or 2.4.5.6 - tetrachloropyrimidine, or the corresponding bromopyrimidines can be used for the condensation with the hydroxymethyl group of the dye.

The 3-aminobenzyl alcohol can be replaced by any one of its derivatives bearing a methyl, methoxy or cyano group or a chlorine or bromine atom in the position 4 or a methyl or methoxy group in the 6 position or a methyl group in the position 2 and a chlorine atom in the position 5.

Instead of sodium 1-hydroxynaphthalene-3.6.8-trisulfonate other coupling components such as those mentioned in the Examples 1 to 111 can be employed, preference being given to the coupling components with two to three sulfonic acid groups which render the final dye sufficiently soluble in the printing pastes and in the padding liquors, whereas the dyes produced from coupling components with one sulfonic acid group are suitable for the conventional dyeing methods using dyebaths in which the dye concentration is very small.

Especially valuable dyes for printing and pad-dyeing cotton are obtained by employing the same halopyrimidines and the same coupling components as in the Examples 2 (fourth paragraph) 3, 4, 5, 8, 12, 20, 26, 27, 28, 33, 38, 42, 43, 54, 64, 65, 75, 101 and 108.

Example 160

68.7 parts of the monoazo dye (as the disodium salt) produce by coupling diazotized 2-amino-naphthalene-4,8-disulfonic acid with 2-hyroxynaphthalene-6-sulfonic acid-(3'-hydroxymethyl)-phenylamide in strongly alkaline solution are dissolved in 1000 parts of water. The solution is cooled to 8–10° and the pH value brought to 11–12. In the course of 2 hours 20 parts of 2.4.6-trichloro-pyrimidine are added in small portions with vigorous stirring and stirring is then continued at 8–10° until the condensation is completed, which takes from 10 to 20 hours. During this time the pH is maintained at 11–12. After neutralization of the solution, the dye formed is salted out, filtered off, washed with common salt solution and dried. It is a water-soluble red powder and dyes wool, silk, synthetic polyamide and cellulose fibers in brilliant red shades of very good light and wet fastness.

The coupling component is produed as follows: 382 parts of the benzene-sulfonic acid ester of 2-hydroxynaphthalene-6-sulfonic acid chloride (prepared according to German Patent 859,027) are added in small portions with good stirring to a mixture at 40–50° of 123 parts of 3-aminobenzyl alcohol, 200 parts of crystallized sodium acetate and 1500 parts of water. The whole is stirred at 40–50° until condensation is completed. On cooling, the precipitate is filtered with suction, stirred into 3500 parts of 4% sodium hydroxide solution and the mixture heated until saponification of the benzenesulfonic acid ester is completed. The 2-hydroxy-naphthalene-6-sulfonic acid-(3'-hydroxymethyl)-phenylamide thus formed is precipitated by acidifying the solution, and then filtered with suction, washed and dried.

The 2.4.6-trichloropyrimidine can be replaced by one of the halopyrimidines mentioned in Example 159.

Instead of the 2-aminonaphthalene-4.8-disulfonic acid employed in the production of the starting dye, other diazo components with at least one, and preferably two or three, sulfonic acid group e.g. 1-aminobenzene-2.4- or -2.5-disulfonic acid, 1-aminonaphthalene-3.6-, -3.8- or -4.8-disulfonic acid, 1-aminonaphthalene-3.6.8-trisulfonic acid, 2-aminonaphthalene-3.6-, -5.7- or -6.8-disulfonic acid, 2-amino-napthalene-3.6.8- or -4.6.8-trisulfonic acid or 4-amino-1.1'-azobenzene-4'.3-disulfonic acid can be employed.

By replacing the 3-aminobenzyl alcohol by one of its derivatives mentioned in Example 159 or the benzenesulfonic acid ester of 2-hydroxynaphthalene-6-sulfonic acid chloride by a benzene-, methylbenzene- or methanesulfonic acid ester of another 1- or 2-hydroxynaphthalenesulfonic acid chloride similar coupling components are produced.

Formulae of representative dyes of the foregoing examples are as follows:

Examples 1 and 2

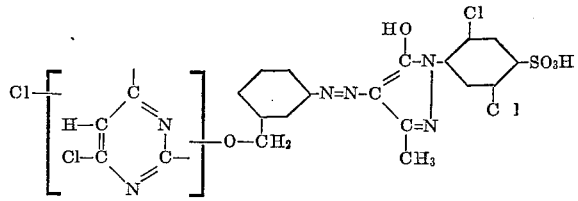

Example 2 (fourth paragraph)

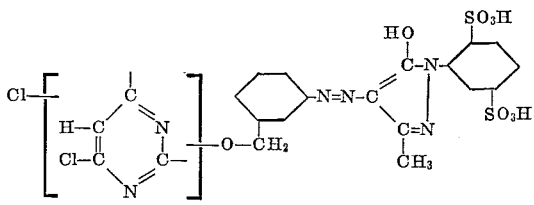

Example 3

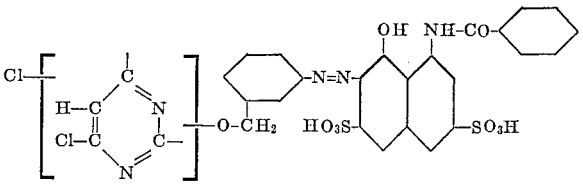

Example 4

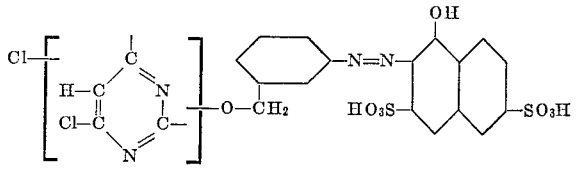

Example 5

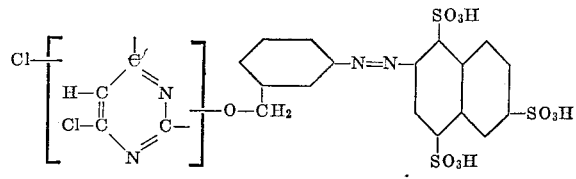

Example 6
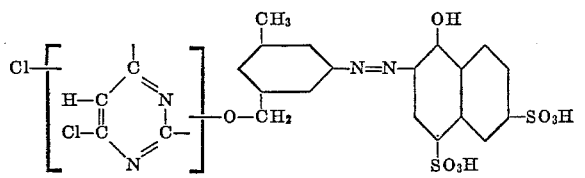
Example 7
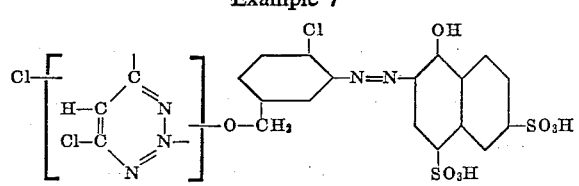
Example 17
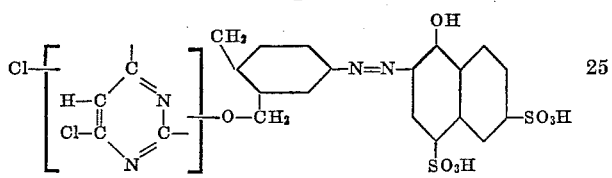
Example 18
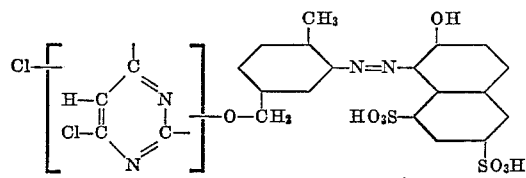
Example 19
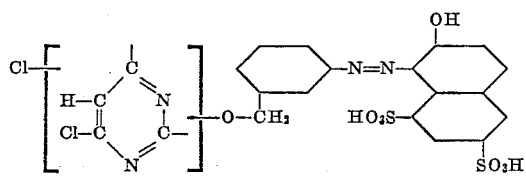
Example 101
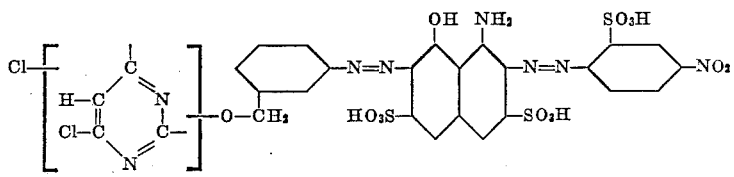
Example 112
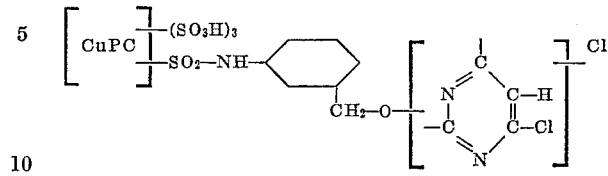
The groups —SO$_3$H and —SO$_2$— are in the positions 3,3′,3″,3‴ of the copper phthalocyanine radical.
Example 113 corresponds to the same general formula as Example 112, but the groups —SO$_3$H and —SO$_2$— are in the positions 4,4′,4″,4‴ of the copper phthalocyanine radical.
Example 139
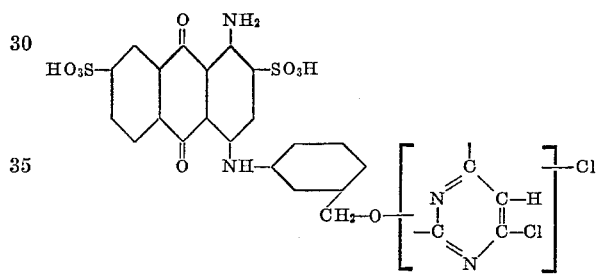
Example 139 (last paragraph)
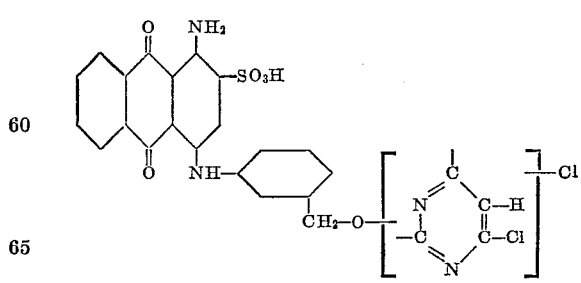
Example 158
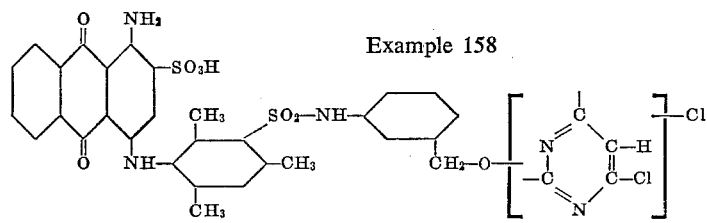

Example 159

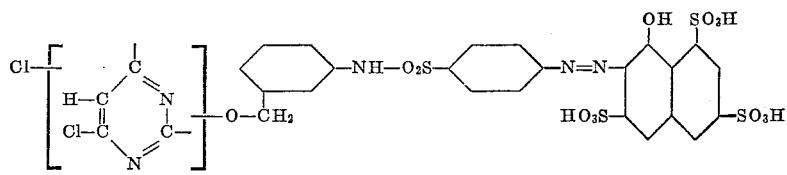

Example 160

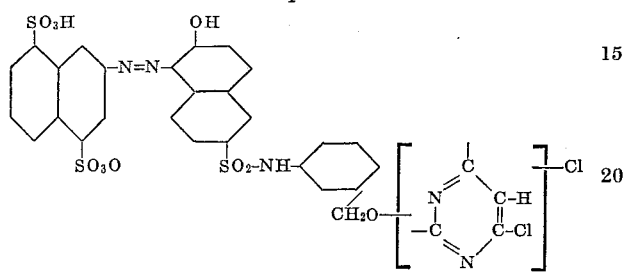

Having thus disclosed the invention what we claim is:

1. Water-soluble dyes of the formula

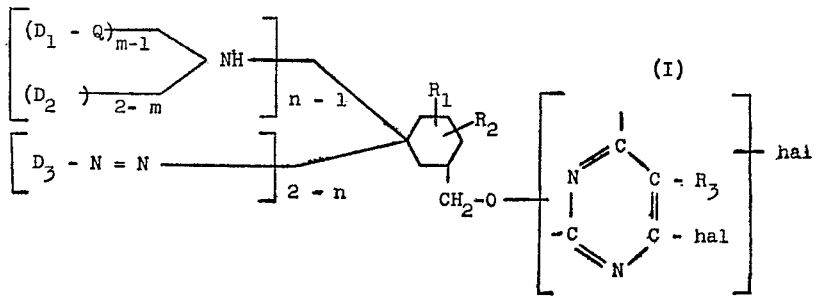

wherein $D_1$ is the radical of a dye selected from the group consisting of
  (a) a benzene-azo-naphthalene dye, a benzene-azo-5-pyrazolone dye and a naphthalene-azo-naphthalene dye, the said monoazo dyes bearing from 1 to 3 sulfonic acid groups,
  (b) a 1-amino-4-phenylamino-anthraquinone-2-sulfonic acid dye,
  a 1 - amino-4-phenylamino-anthraquinone-2,5-disulfonic acid dye,
  a 1 - amino-4-phenylamino-anthraquinone-2,6-disulfonic acid dye,
  a 1 - amino-4-phenylamino-anthraquinone-2,7-disulfonic acid dye,
  a 1 - amino-4-phenylamino-anthraquinone-2,8-disulfonic acid dye, and
  (c) a copper-phthalocyanine dye bearing from 2 to 3 water-solubilizing groups selected from the group consisting of —$SO_3H$ and —$SO_2$—$NH_2$, $D_2$ is a radical selected from the group consisting of 1-amino-2-sulfo-anthraquinonyl-4, 1-amino-2,5-disulfo-anthraquinonyl - 4, 1-amino-2,6-disulfo-anthraquinonyl-4, 1-amino-2,7-disulfo-anthraquinonyl-4 and 1-amino-2,8-disulfo-anthraquinonyl-4, $D_3$ is the radical of a coupling component bearing 1 to 3 sulfonic acid groups and selected from the group consisting of the hydroxynaphthalene, amino-naphthalene, 1-phenyl-3-methyl-5-pyrazolone, 1-naphthyl-3 - methyl - 5-pyrazolone, acetoacetylaminobenzene, acetoacetylaminonaphthalene and phenylazo-amino-hydroxynaphthalene, phenylazo being in ortho-position to amino, Q is a member selected from the group consisting of —CO— and —$SO_2$ and is bound to a carbon atom of $D_1$, $R_1$ is a member selected from the group consisting of hydrogen, hydroxy, chlorine, bromine, cyano, methyl and lower alkoxy, $R_2$ is a member selected from the group consisting of hydrogen, chlorine, bromine, methyl and lower alkoxy, $R_3$ is a member selected from the group consisting of hydrogen, chlorine, bromine, methyl, carboxy and carboxymethyl, hal is a halogen atom with an atomic number from 17 to 35, inclusive, $n$ is one of the integers 1 and 2, and $m$ is one of the integers 1 and 2.

2. Water-soluble dyes of the formula

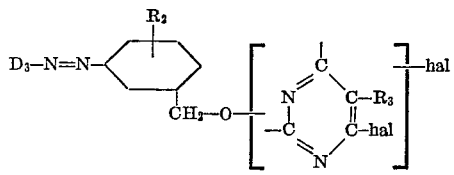

wherein $D_3$ is the radical of a coupling component bearing from 1 to 3 sulfonic acid groups and selected from the group consisting of the hydroxynaphthalene, amino-naphthalene, 1-phenyl-3-methyl-5-pyrazolone, 1-naphthyl-3-methyl-5-pyrazolone, acetoacetylamino-benzene, acetoacetylaminophthalene and phenylazo-amino-hydroxynaphthalene, phenylazo being in ortho-position to amino, $R_2$ is a member selected from the group consisting of hydrogen, chlorine, bromine, methyl and lower alkoxy, $R_3$ is a member selected from the group consisting of hydrogen, chlorine, bromine, methyl, carboxy and carboxymethyl, and hal is a halogen atom with an atomic number from 17 to 35, inclusive.

3. Water-soluble dyes of the formula

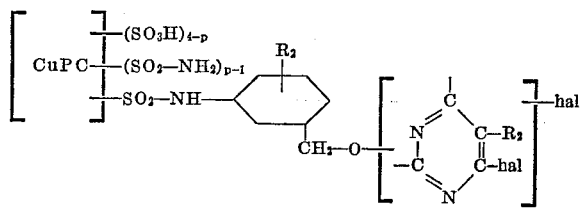

wherein $R_2$ is a member selected from the group consisting of hydrogen, chlorine, bromine, methyl and lower alkoxy, $R_3$ is a member selected from the group consisting of hydrogen, chlorine, bromine, methyl, carboxy and carboxymethyl, hal is a halogen atom with an atomic number from 17 to 35, inclusive, and $p$ is one of the integers 1, 2 and 3.

4. Water-soluble dyes of the formula

[structural formula]

wherein $_2$ is a member selected from the group consisting of hydrogen, chlorine, bromine, methyl and lower alkoxy, $R_3$ is a member selected from the group consisting of hydrogen, chlorine, bromine, methyl, carboxy and carboxymethyl, hal is a halogen atom with an atomic number from 17 to 35, inclusive, and $r$ is one of the integers 1 and 2.

5. The dye of the formula

[structural formula]

6. The dye of the formula

[structural formula]

7. The dye of the formula

[structural formula]

8. The dye of the formula

[structural formula]

9. The dye of the formula

[structural formula]

10. The dye of the formula

[structural formula]

11. The dye of the formula

[structural formula]

12. The dye of the formula

[structural formula]

13. The dye of the formula

[structural formula]

14. The dye of the formula

[structural formula]

wherein the groups —SO₃H and —SO₂— are in the positions 3,3',3'',3''', of the copper phthalocyanine radical.

15. The dye of the formula

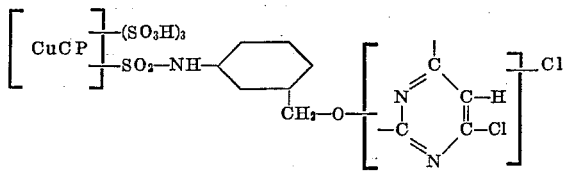

wherein the groups —SO₃H and —SO₂— are in the positions 4,4',4'',4''' of the copper phthalocyanine molecule.

16. The dye of the formula

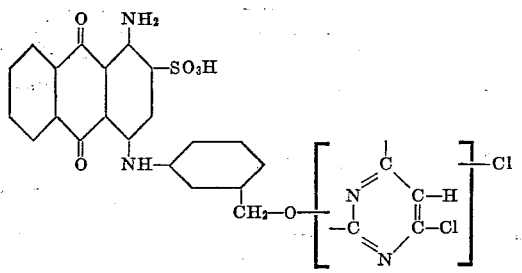

17. The dye of the formula

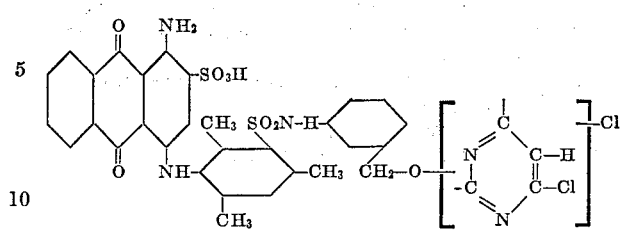

References Cited
UNITED STATES PATENTS
3,218,310  11/1965  Benz et al. _____ 260—154

CHARLES B. PARKER, *Primary Examiner.*

D. M. PAPUGA, *Assistant Examiner.*

U.S. Cl. X.R.

8—12, 41, 42, 51, 55; 260—37, 163, 199, 200, 242, 262